United States Patent
Gleitman

(10) Patent No.: US 8,364,406 B2
(45) Date of Patent: Jan. 29, 2013

(54) MULTIPLE DISTRIBUTED SENSORS ALONG A DRILLSTRING

(75) Inventor: Daniel D. Gleitman, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1815 days.

(21) Appl. No.: 11/072,795

(22) Filed: Mar. 4, 2005

(65) Prior Publication Data

US 2005/0200498 A1 Sep. 15, 2005

Related U.S. Application Data

(60) Provisional application No. 60/550,033, filed on Mar. 4, 2004.

(51) Int. Cl.
*G06F 19/00* (2011.01)

(52) U.S. Cl. ........................................ 702/11; 73/152.03

(58) Field of Classification Search ............... 340/855.5, 340/854.3; 73/152.03; 702/10; 175/41, 175/40, 50
See application file for complete search history.

(56) References Cited

U.S. PATENT DOCUMENTS

| | | | | |
|---|---|---|---|---|
| 3,223,184 A | 12/1965 | Jones et al. | ...................... | 175/41 |
| 4,273,212 A | 6/1981 | Dorr et al. | ...................... | 181/102 |
| 4,379,493 A | 4/1983 | Thibodeaux | ...................... | 175/61 |
| 4,384,483 A | 5/1983 | Dellinger et al. | ............... | 73/151 |
| 4,535,429 A | 8/1985 | Russell et al. | .................. | 367/85 |
| 4,553,428 A | 11/1985 | Upchurch | ...................... | 73/152 |
| 4,697,650 A | 10/1987 | Fontenot | ...................... | 175/50 |
| 4,779,852 A | 10/1988 | Wassell | .......................... | 267/125 |
| 4,791,797 A | 12/1988 | Paske et al. | ...................... | 73/152 |
| 4,805,449 A | 2/1989 | Das | ................................. | 73/151 |
| 5,144,589 A * | 9/1992 | Hardage | .......................... | 367/25 |
| 5,156,223 A | 10/1992 | Hipp | ............................... | 175/296 |
| 5,563,512 A | 10/1996 | Mumby | .......................... | 324/339 |
| 5,581,024 A * | 12/1996 | Meyer et al. | ............... | 73/152.03 |
| 5,679,894 A | 10/1997 | Kruger et al. | .............. | 73/152.03 |
| 5,798,488 A | 8/1998 | Beresford et al. | ........... | 181/102 |
| 5,804,713 A | 9/1998 | Kluth | .......................... | 73/152.01 |
| 5,812,068 A * | 9/1998 | Wisler et al. | ................ | 340/855.5 |
| 5,886,303 A | 3/1999 | Rodney | .......................... | 181/102 |
| 5,995,020 A | 11/1999 | Owens et al. | .............. | 340/854.9 |
| 6,026,914 A | 2/2000 | Adams et al. | ................... | 175/45 |
| 6,079,505 A | 6/2000 | Pignard et al. | .................. | 175/40 |
| 6,279,392 B1 | 8/2001 | Shahin, Jr. et al. | ......... | 73/152.52 |
| 6,325,123 B1 | 12/2001 | Gao et al. | ...................... | 152/416 |
| 6,405,136 B1 * | 6/2002 | Li et al. | ............................ | 702/10 |
| 6,464,021 B1 | 10/2002 | Edwards | .......................... | 175/61 |
| 6,516,880 B1 | 2/2003 | Otten et al. | ............... | 166/250.11 |
| 6,516,898 B1 | 2/2003 | Krueger | ............................ | 175/50 |

(Continued)

FOREIGN PATENT DOCUMENTS

GB 2235540 A 3/1991

OTHER PUBLICATIONS

Falconer, et al., Applications of a Real Time Wellbore Friction Analysis, SPE 18649, 1989, pp. 265-274.

(Continued)

*Primary Examiner* — Albert Wong
(74) *Attorney, Agent, or Firm* — Clive Menezes; Baker Botts L.L.P.

(57) ABSTRACT

Systems and methods for downhole measurement and communications are disclosed. The system includes a communications medium, at least partially disposed in a drillpipe, a processor coupled to the communications medium, at least two sensor modules coupled to the communications medium, where at least one of the sensor modules is along a drillpipe, and at least one communications coupler to couple at least one sensor module to the communications medium.

18 Claims, 13 Drawing Sheets

U.S. PATENT DOCUMENTS

| | | | | |
|---|---|---|---|---|
| 6,568,486 | B1 | 5/2003 | George | 175/45 |
| 6,581,455 | B1 | 6/2003 | Berger et al. | 73/152.52 |
| 6,670,880 | B1 | 12/2003 | Hall et al. | 336/132 |
| 6,847,304 | B1* | 1/2005 | McLoughlin | 340/854.3 |
| 2002/0017386 | A1 | 2/2002 | Ringgenberg et al. | 166/250.17 |
| 2002/0074165 | A1 | 6/2002 | Lee et al. | 175/48 |
| 2003/0209365 | A1 | 11/2003 | Downton | 175/50 |
| 2005/0024231 | A1* | 2/2005 | Fincher et al. | 340/854.4 |

OTHER PUBLICATIONS

Frank Reiber, et al., On-Line Torque & Drag: A Real-Time Drilling Performance Optimization Tool, SPE 52836, 1999, pp. 1-10.

Paul Pastusek, et al., A Model for Borehole Oscillations, SPE 84448, 2003, pp. 1-16.

Tom Gaynor, et al., Quantifying Tortuosities by Friction Factors in Torque and Drag Model, SPE 77617, 2002, pp. 1-8.

Ho, H-S., An Improved Modeling Program for Computing the Torque and Drag in Directional and Deep Wells, SPE 18047, 1988, pp. 407-418.

Johancsik, C.A., et al., Torque and Drag in Directional WellsPrediction and Measurement, SPE 11380, 1984, pp. 201-208.

Cook, R.L., et al., First Real Time Measurements of Downhole Vibrations, Forces, and Pressures Used To Monitor Directional Drilling Operations, SPE 18651, 1989, pp. 283-290.

G.E. Guillen and W.G. Lesso Jr., The Use of Weight on Bit, Torque, and Temperature To Enhance Drilling Efficiency, SPE 12165, 1983, pp. 1-12.

Heisig, G., et al., Downhole Diagnosis of Drilling Dynamics Data Provides New Level Drilling Process Control to Driller, SPE 49206, 1998, pp. 649-658.

Wolf, S.F., et al., Field Measurements of Downhole Drillstring Vibrations, SPE 14330, 1985, pp. 1-12.

J.T. Finger, et al., Development of a System for Diagnostic-While-Drilling (DWD), SPE 79884, 2003, pp. 1-9.

A.J. Mansure, et al., Interpretation of Diagnostics-While-Drilling Data, SPE 84244, 2003, pp. 1-13.

A. Leseultre, et al., An Instrumented Bit: A Necessary Step to the Intelligent BHA, SPE 39341, pp. 457-463.

U.S. Appl. No. 60/491,567, filed Jul. 31, 2003, Roger Fincher.

U.S. Appl. No. 60/478,237, filed Jun. 13, 2003, Roger Fincher.

U.S. Appl. No. 10/793,350, filed Mar. 4, 2004, Rodney, et al.

U.S. Appl. No. 10/792,541, filed Mar. 3, 2004, Rodney, et al.

U.S. Appl. No. 10/793,537, filed Mar. 4, 2004, Dudley, et al.

U.S. Appl. No. 10/793,062, filed Mar. 4, 2005, Gleitman, et al.

U.S. Appl. No. 11/051,762, filed Feb. 4, 2005, Daniel Gleitman.

U.S. Appl. No. 11/070,625, filed Mar. 2, 2005, Daniel Gleitman.

E Alan Coats, Marty Paulk, Chris Dalton, "Wired Composite Tubing Reduces Drilling Risk," Drilling Contractor, pp. 22-23, Jul./Aug. 2002.

"IntelliPipe™ Technology: Wired for Speed and Durability," U.S. Department of Energy Office of Fossil Energy HTTP;//FOSSIL.ENERGY.GOV/NEWS/TECHLINES/03/TL_INTELLIPIPE_RMOTCTEST.HTML, Jun. 5, 2003.

Michael J. Jellison and David R. Hall, "Intelligent Drill Pipe Creates the Drilling Network," SPE International, SPE 80454, pp. 1-8, presented at the SPE Asia Pacific Oil and Gas Conference and Exhibition, Jakarta, Indonesia, Apr. 15-17, 2003.

A. Judzis, T. S. Green, G. M. Hoversten, and A. D. Black, "Seismic While Drilling for Enhanced Look-Ahead-of-Bit Capabilities—Case Study of Successful Mud Pulse Coupling Demonstration,"Society of Professional Engineers, SPE 63194, pp. 1-4, presented at the 2000 SPE Annual Technical Conference and Exhibition Held in Dallas, Texas, Oct. 1-4, 2000.

Daniel C. Minette, Eric Molz, "Utilizing Acoustic Standoff Measurements to Improve the Accuracy of Density and Neutron Measurements," Society of Petroleum Engineers Inc., SPE 56447, pp. 1-14, presented at the 1999 SPE Annual Technical Conference and Exhibition Held in Houston, Texas, Oct. 3-6, 1999.

"Telemetry Drill Pipe: Enabling Technology for the Downhole Internet," HTTP://WWW.INTELLIPIPE.COM/BROCHURES.ASP, Intellipipe Brochure 1.

"Telemetry Drill Pipe: Enabling Technology for the Downhole Internet," HTTP://WWW.INTELLIPIPE.COM/BROCHURES.ASP, Intellipipe Brochure 2.

Chirs Ward and Espen Andreassen, "Pressure-While-Drilling Data Improve Reservoir Drilling Performance," SPE Drilling & Completion, Mar. 1998, pp. 19-24.

C.A. Johancsik, et al., Torque and Drag in Directional Wells—Prediction and Measurement, Journal of Petroleum Technology, pp. 987-992 (Jun. 1984).

* cited by examiner

US 8,364,406 B2

MULTIPLE DISTRIBUTED SENSORS ALONG A DRILLSTRING

CROSS-REFERENCE TO RELATED APPLICATION

This application claims priority to commonly owned U.S. provisional patent application Ser. No. 60/550,033, filed Mar. 4, 2004, entitled "Multiple Distributed Sensors Along A Drillpipe," by Daniel Gleitman.

BACKGROUND

As oil well drilling becomes increasingly complex, the importance of collecting downhole data while drilling increases.

DETAILED DESCRIPTION

Figure 1:
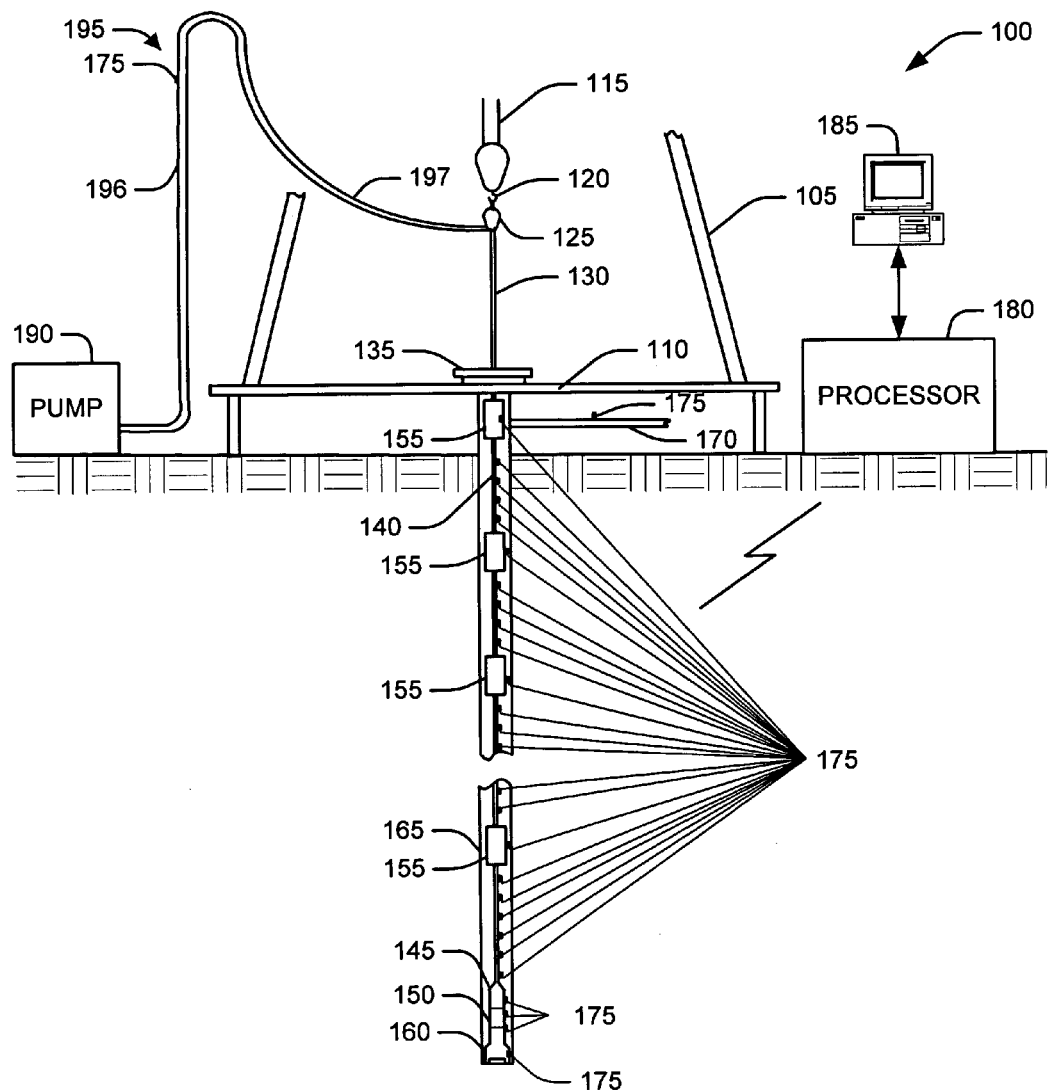
FIG. 1 shows a system for surface real-time processing of downhole data.

As shown in FIG. 1, oil well drilling equipment 100 (simplified for ease of understanding) may include a derrick 105, derrick floor 110, draw works 115 (schematically represented by the drilling line and the traveling block), hook 120, swivel 125, kelly joint 130, rotary table 135, drillpipe 140, one or more drill collars 145, one or more MWD/LWD tools 150, one or more subs 155, and drill bit 160. Drilling fluid is injected by a mud pump 190 into the swivel 125 by a drilling fluid supply line 195, which may include a standpipe 196 and kelly hose 197. The drilling fluid travels through the kelly joint 130, drillpipe 140, drill collars 145, and subs 155, and exits through jets or nozzles in the drill bit 160. The drilling fluid then flows up the annulus between the drillpipe 140 and the wall of the borehole 165. One or more portions of borehole 165 may comprise open hole and one or more portions of borehole 165 may be cased. The drillpipe 140 may be comprised of multiple drillpipe joints. The drillpipe 140 may be of a single nominal diameter and weight (i.e. pounds per foot) or may comprise intervals of joints of two or more different nominal diameters and weights. For example, an interval of heavy-weight drillpipe joints may be used above an interval of lesser weight drillpipe joints for horizontal drilling or other applications. The drillpipe 140 may optionally include one or more subs 155 distributed among the drillpipe joints. If one or more subs 155 are included, one or more of the subs 155 may include sensing equipment (e.g., sensors), communications equipment, data-processing equipment, or other equipment. The drillpipe joints may be of any suitable dimensions (e.g., 30 foot length). A drilling fluid return line 170 returns drilling fluid from the borehole 165 and circulates it to a drilling fluid pit (not shown) and then the drilling fluid is ultimately recirculated via the mud pump 190 back to the drilling fluid supply line 195. The combination of the drill collar 145, MWD/LWD tools 150, and drill bit 160 is known as a bottomhole assembly (or "BHA"). The combination of the BHA, the drillpipe 140, and any included subs 155, is known as the drillstring. In rotary drilling the rotary table 135 may rotate the drillstring, or alternatively the drillstring may be rotated via a top drive assembly.

The terms "couple" or "couples," as used herein are intended to mean either an indirect or direct connection. Thus, if a first device couples to a second device, that connection may be through a direct connection, or through an indirect electrical connection via other devices and connections. The term "upstream" as used herein means along a flow path towards the source of the flow, and the term "downstream" as used herein means along a flow path away from the source of the flow. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

One or more downhole sensor modules 175 are distributed along the drillstring, with the distribution depending on the type of sensor and the needs of the system. One or more of the downhole sensor modules may be located on or within one or more portions of drillpipe. Other downhole sensor modules 175 may be located on or within subs 155, which may be located between sections of drillpipe. Other downhole sensor modules 175 may located on or within the drill collar 145 or the MWD/LWD tools 150. Still other downhole sensor modules 180 may be located on or within the bit 180. The downhole sensors incorporated in the downhole sensor modules, as discussed below, may include pressure sensors, strain sensors, acceleration sensors, temperature sensors, acoustic sensors, gravitational field sensors, gyroscopes, resistivity sensors, weight sensors, torque sensors, bending-moment sensors, vibration sensors, rotation sensors, rate of penetrations sensors, magnetic field sensors, calipers, electrodes, gamma ray detectors, density sensors, neutron sensors, dipmeters, imaging sensors, and other sensors useful in well logging and well drilling.

Other sensor modules 175 may be located at or near the surface to measure, for example, one or more of drilling fluid supply line (e.g. standpipe) or return line pressures. In many cases a sensor module 175 located on or along the standpipe 196 (or other drilling fluid supply line location) may be used to provide drillstring interior pressure measurements at or near the top of the drillstring or borehole 165. In certain example implementations, the drillstring interior pressure may be determined inferentially based on pressure measurements, using, for example, pressure measurements taken from the drilling fluid supply line. In some example implementations, a sensor module 175 located on or along a return line may be used to provide drillstring exterior or annulus pressure measurements at or near the top of the drillstring or borehole 165. In some example systems, drillstring exterior or annulus pressure measurements at or near the top of the drillstring or borehole 165 may be determined inferentially, using, for example, pressure measurements taken on a return line. In some example systems, drillstring exterior pressure at the top of the drillstring or borehole 165 may be determined inferentially based on atmospheric pressure. Still other sensor modules 175 may be affixed to one or more locations along the borehole 165. Other sensor modules 175 may be circulated in the drilling fluid.

In general the sensor modules 175 may include one or more sensor devices to measure one or more physical properties. The sensor devices may comprise strain gauge devices, semiconductor devices, photonic devices, quartz crystal devices, fiber optic devices, or other devices to convert a physical property into an electrical or photonic signal. In certain embodiments, the physical property values may be directly obtained from the output of the one or more sensor devices in the sensor modules 175. In other embodiments, property value measurements may be obtained based on the output of the one or more sensor devices in conjunction with other data. For example, the measured property value may be determined based on material properties or dimensions, additional sensor measurements, analysis, or calibration.

One or more sensor modules 175 or one or more sensor devices within a sensor module 175 may measure one or more components of a physical property. In the case of sensor modules 175 to measure to measure one or more pressures, the components of the physical property (i.e., pressure) may include one or more static or stagnation pressures. For example, one or more sensor modules 175 or one or more sensor devices in the sensor modules 175 may be oriented perpendicular to streamlines of the drilling fluid flow. One or more sensor modules 175 or one or more sensor devices in one or more sensor modules 175 may measure stagnation pressure by orienting the sensor modules 175 or the sensor devices to face, or partially face, into the drilling fluid flow. In certain implementations, one or more sensor modules 175 or one or more sensor devices in a sensor module 175 may use an extended pitot tube approach or a shallow ramping port to orient the sensor modules 175 or sensor device in sensor module 175 to face, or partially face, into the drilling fluid flow. The measurement accuracy of the stagnation pressure may vary depending on a degree of boundary layer influence.

In the case of sensor modules 175 or one or more sensor devices within a sensor module 175 to measure one or more forces, the components of the physical property (i.e. force) may include axial tension or compression, or torque, along the drillpipe. One or more sensor modules 175 or one or more sensor devices within a sensor module 175 may be used to measure one or more force components with which force components reacted by or consumed by the borehole 165, such as borehole-drag or borehole-torque, along the drillpipe may be determined. One or more sensor modules 175 or one or more sensor devices within a sensor module 175 may be used to measure one or more other force components such as pressure-induced forces, bending forces, or other forces. One or more sensor modules 175 or one or more sensor devices within a sensor module 175 may be used to measure combinations of forces or force components. In certain implementations, the drillstring may incorporate one or more sensors to measure parameters other than force, such as temperature, pressure, or acceleration.

In the case of sensor modules 175 or sensor devices within a sensor module 175 to measure acceleration, one or more of the sensor modules 175 or sensor devices may measure the acceleration of the drillpipe 140 in one or more directions. For example, one or more sensor modules 175 or one or more sensor devices within a sensor module 175 may measure the acceleration of the drillpipe due to the rotation of the drillpipe 140. Other sensor modules 175 or one or more sensor devices within a sensor module 175 may measure the acceleration of the drillpipe in one or more directions along the borehole 165.

In one example implementation, one or more sensor modules 175 are located on or within the drillpipe 140. Other sensor modules 175 may be on or within one or more drill collars 145 or the one or more MWD/LWD tools 150. Still other sensor modules 175 may be in built into, or otherwise coupled to, the bit 160. Still other sensor modules 175 may be disposed on or within one or more subs 155. One or more sensor modules 175 may provide one or more force or torque components experienced by the drillstring at surface. In one example implementation, one or more sensor modules 175 may be incorporated into the draw works 115, hook 120, swivel 125, or otherwise employed at surface to measure the one or more force or torque components experienced by the drillstring at the surface.

The one or more sensor modules 175 may be coupled to portions of the drillstring by adhesion or bonding. This adhesion or bonding may be accomplished using bonding agents such as epoxy or fasters. The one or more sensor modules 175 may experience a force, strain, or stress field related to the force, strain, or stress field experienced proximately by the drillstring component that is coupled with the sensor module 175. Other sensor modules 175 may be coupled to portions of the drillstring by threading or with use of fasters.

Other sensor modules 175 or one or more sensor devices within a sensor module 175 may be coupled to not experience all, or a portion of, the physical property (e.g., acceleration, pressure, force, strain, or stress field) experienced by the drillstring component coupled proximate to the sensor module 175. Sensor modules 175 or sensor devices within a sensor module 175 coupled in this manner may, instead, may experience other ambient conditions, such as temperature. These sensor modules 175 or sensor devices within a sensor module 175 may be used for signal conditioning, compensation, or calibration.

The sensor modules 175 may be coupled to one or more of: interior surfaces of drillstring components (e.g. bores), exterior surfaces of drillstring components (e.g. outer diameter), recesses between an inner and outer surface of drillstring components. The sensor modules 175 may be coupled to one or more faces or other structures that are orthogonal to the axes of the diameters of drillstring components. The sensor modules 175 may be coupled to drillstring components in one or more directions or orientations relative to the directions or orientations of particular force components or combinations of physical property components to be measured.

In certain implementations, sensor modules 175 or one or more sensor devices within a sensor module 175 may be coupled in sets to drillstring components. In other implementations, sensor modules 175 may comprise sets of sensor devices. When sets of sensor modules 175 or sets of sensor devices are employed, the elements of the sets may be coupled in the same, or different ways. For example, the elements in a set of sensor modules 175 or sensor devices may have different directions or orientations, relative to each other. For example, in the case of sensor modules 175 to measure one or more forces, using set of sensor modules 175 or a set of sensor devices, one or more elements of the set may be bonded to experience a strain field of interest and one or more other elements of the set (i.e. "dummies") may be bonded to not experience the same strain field. The dummies may, however, still experience one or more ambient conditions. Elements in a set of sensor modules 175 or sensor devices may be symmetrically coupled to a drillstring component. For example three, four, or more elements of a set of sensor devices or a set of sensor modules 175 may spaced substantially equally around the circumference of a drillstring component. Sets of sensor module 175 or sensor devices may be used to: measure multiple force (e.g. directional) components, separate multiple force components, remove one or more force components from a measurement, or compensate for factors such as pressure or temperature. Certain example sensor modules 175 may include sensor devices that are primarily unidirectional. Sensor modules 175 may employ commercially available sensor device sets, such as bridges or rosettes.

In certain implementations, one or more sensor modules 175 may be coupled to drillstring components that are used for drilling and that are subsequently left in the borehole 165. These drillstring components may be used in casing-while-drilling (i.e. drilling with casing) operations. The drillstring components may be included in a completed well.

In general, the sensor modules 175 convert physical property into one or more signals. The one or more signals from the sensor modules 175 may be analog or digital. In certain implementations, one or more sensor modules 175 may be oriented to measure one or more of tension or compression along the drillstring (i.e. with respect to the up-hole/downhole axis). As used herein, "tensile force" means one or more of tension or compression forces along the drillstring. In these implementations, the sensor modules 175 may be coupled with particular drillstring components and may include strain responsive sensor devices (e.g. strain gauges). The output of the sensor module 175 may vary based on the modulus of elasticity of the material of drillstring component coupled with the force sensor. This modulus of elasticity may be used when determining the force. In certain implementations, other inputs (e.g. tensile areas) may be used to determine tension or compression forces in one or more drillstring components from the stresses. Similarly, one or more sensor modules 175 may be oriented to measure torque on the drillstring (i.e. about the up-hole/downhole axis). For example, the sensor modules 175 may be coupled to diameter surfaces (e.g. inner or outer diameters) of drillstring components and may employ outputs from sensor devices (e.g., one or more strain gauges) and may consider the shear modulus of elasticity of the drillstring component material. The torques may be determined based on the stresses from the strains and other inputs (e.g. polar moment of inertia of the cross sectional area).

Figure 2:
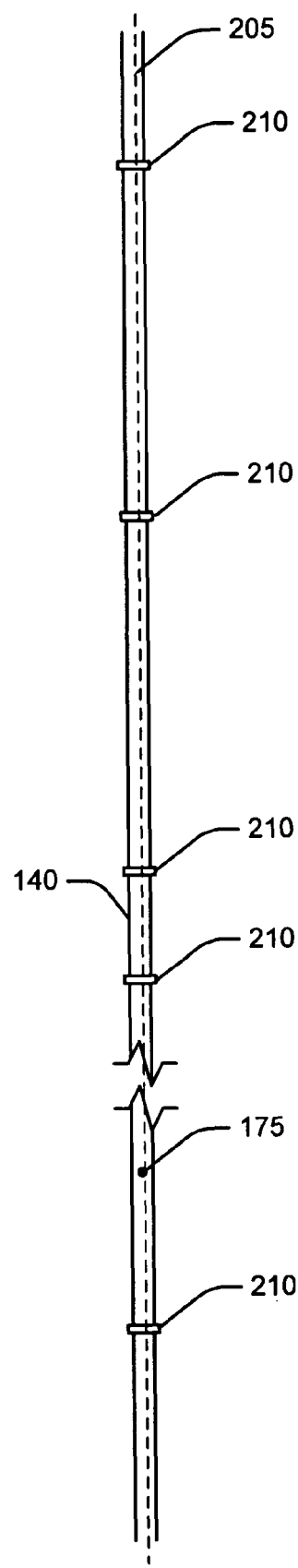
FIG. 2 illustrates a portion of drillpipe with an affixed sensor and a communications medium.

A portion of drillpipe 140 is schematically illustrated in FIG. 2. The illustrated portion of drillpipe includes interfaces 210 between the joints that form drillpipe 140. Interfaces 210 may include threaded mechanical connections which may have different inner and outer diameters as compared to the balance of the drillpipe. One or more of the interfaces 210 may include communication interfaces. Signals from sensor modules 175 are coupled to communications medium 205, which may be disposed in the drillpipe 140 or external to the drillpipe 140. Drillpipe, such as drillpipe 140, with communications medium 205, may collectively be referred to as a wired drillpipe.

In one example system, the communications medium 205 may be located within an inner annulus of the drillpipe 140. The communications medium 205 may comprise one or more concentric layers of a conductor and an insulator disposed within the drillstring. In another example system, the drillpipe 140 may have a gun-drilled channel though at least portions of its length. In such a drillpipe 140, the communications medium 205 may be placed in the gun-drilled channel. In another example system, the communications medium 205 may be fully or partly located within a protective housing, such as a capillary tubing that runs at least a portion of the length of the drillpipe 140. The protective housing may be attached or biased to the drillpipe inner diameter or stabilized within the drillpipe bore.

The communications medium 205 may be a wire, a cable, a fluid, a fiber, or any other medium. In certain implementations, the communications medium may permit high data transfer rates. The communications medium 205 may include one or more communications paths. For example, one communications path may connect to one or more sensor modules 175, while another communications path may connect another one or more sensor sensors 175. The communications medium 205 may extend from the drillpipe 140 to the subs 155, drill collar 145, MWD/LWD tools 150, and the bit 160. The communications medium 205 may include physical connectors or mating conductors to complete a transition in the communications medium 205 across drillpipe joints and other connections.

The communications medium 205 may transition from one type to another along the drillstring. For example, one or more portions of the communications medium 205 may include an LWD system communications bus. One more or portions of the communications medium 205 may comprise a "short-hop" electromagnetic link or an acoustical telemetry link. The "short-hop" electromagnetic links or acoustical telemetry link may be used to interface between drillpipe joints or across difficult-to-wire drillstring components such as mud motors. In certain implementations, the communications medium may include long-hop (i.e., from a downhole transmitter to a surface receiver) telemetry. For example, the long-hop telemetry may be mud-pulse telemetry, electromagnetic telemetry through the Earth, or acoustic telemetry through the drillstring. The long-hop telemetry may employ one or more repeaters.

A processor 180 may be used to collect and analyze data from one or more sensor modules 175. This processor 180 may process the force data and provide an output that is a function of the processed or unprocessed force data. This output may then be used in the drilling process. The processor may include one or more processing units that operate together (e.g., symmetrically or in parallel) or one or more processing units that operate separately. The processing units may be in the same location or in distributed locations. The processor 180 may alternatively be located below the surface, for example, within the drillstring. The processor 180 may operate at a speed that is sufficient to be useful in the drilling process. The processor 180 may include or interface with a terminal 185. The terminal 185 may allow an operator to interact with the processor 180.

The communications medium 205 may transition to connect the drillstring to the processor 180. The transition may include a mechanical contact which may include a rotary brush electrical connection. The transition may include a non-contact link which may include an inductive couple or a short-hop electromagnetic link.

The sensor modules 175 may communicate with the processor 180 through the communications medium 205. Communications over the communications medium 205 can be in the form of network communications, using, for example, Ethernet. Each of the sensor modules 175 may be addressable individually or in one or more groups. Alternatively, communications can be point-to-point. Whatever form it takes, the communications medium 205 may provide high-speed data communication between the sensors in the borehole 165 and the processor 180. The speed and bandwidth characteristics of the communications medium 205 may allow the processor 180 to perform collection and analysis of data from the sensor modules 175 fast enough for use in the drilling process. This data collection and analysis may be referred to as "real-time" processing. Therefore, as used herein, the term "real-time" means a speed that is useful in the drilling process.

Figure 3:
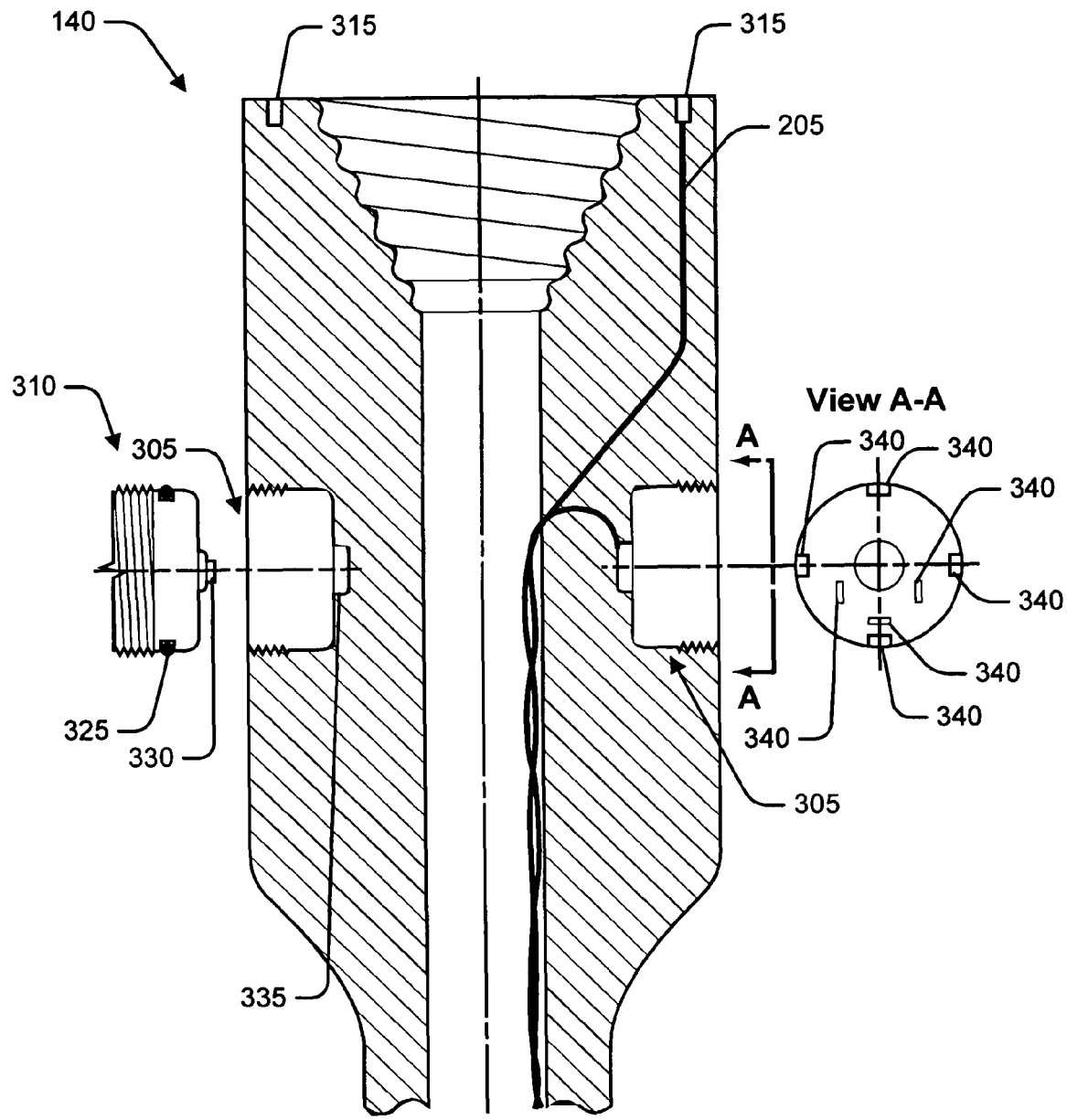
FIG. 3 illustrates a portion of drillpipe with a sensor module and a sensor-module receptacle

A portion of a drillstring component is illustrated in FIG. 3. By way of example, the illustrated drillstring component is a joint of drillpipe 140. Similar implementation may be applied to one or more of subs 155, collars, MWD/LWD tools 175, or the bit 160. The example drillpipe joint has an elongated box-end upset section. A sensor-module receptacle 305 is defined by a recess in the exterior of the drillpipe joint's elongated upset section, below the rotary shoulder connection threads. The sensor-module receptacle 305 may be any suitable size or shape to engage and retain at least a portion of a sensor module 175. The sensor module 175 may include an electronics module 310. The sensor-module receptacle 305 may also include threading to retain at least a portion of the sensor module 175 (e.g. the electronics module 310) within sensor-module receptacle 305. The drillpipe 140 may also include one or more drillpipe coupler to couple the sensor modules 175 to the couplers, such as drillpipe coupler 315, to couple signals between portions of the drillstring and between the sensor module and the communications medium 210. Communications medium 205 may be disposed in drillpipe 140, and drillpipe couplers such as drillpipe coupler 315 may couple signals to the communications medium 205 and may connect the communications medium 205 in the drillpipe 140 with the communications medium in other drillstring elements. When the sensor-module receptacle 305 is empty, a sensor-module-receptacle cover (not shown) may be used to cover the sensor-module receptacle 305. An example sensor-module-receptacle cover may have an exterior for engaging the sensor-module receptacle 305. FIG. 3 shows an example electronics module 310 aligned for insertion into a sensor-module receptacle 305.

FIG. 3 shows an example sensor-module-receptacle with electronics module 310 removed to highlight remaining details within the sensor-module-receptacle. Example locations within the sensor-module-receptacle are shown on the right side of FIG. 3 for coupling of one or more sensor devices 340 which may be elements of a sensor module 175. The sensor devices may be, for example, strain gauge devices or sets of strain gauges (e.g. bridges or rosettes). Such example locations may be at locations along a wall of sensor-module receptacle 305, which may be a substantially cylindrical wall. Example locations for mounting sensor devices, may be on the bottom (i.e. radially most inward) surface of sensor-module receptacle 305. Other example sensor devices 340 may be ported to the exterior of the electronics module 310 to measure, for example, external pressure. Other sensor devices 340 may be affixed to any location where the desired property is observed. For example, acceleration sensors or rotational velocity sensors may be affixed to a location on or in the drillstring where the physical property is incident. One or more sensor devices may be configured within a sensor-module receptacle 305 with any of the sensor device quantities, symmetry, types, directions, orientations, coupling approaches, and other characteristics of the sensor devices discussed above. Wiring between the sensor devices 340 and the electronics modules 310 may be routed through holes or grooves from one or more sensor devices to electronics module 310, using connectors or soldering.

Figure 4:
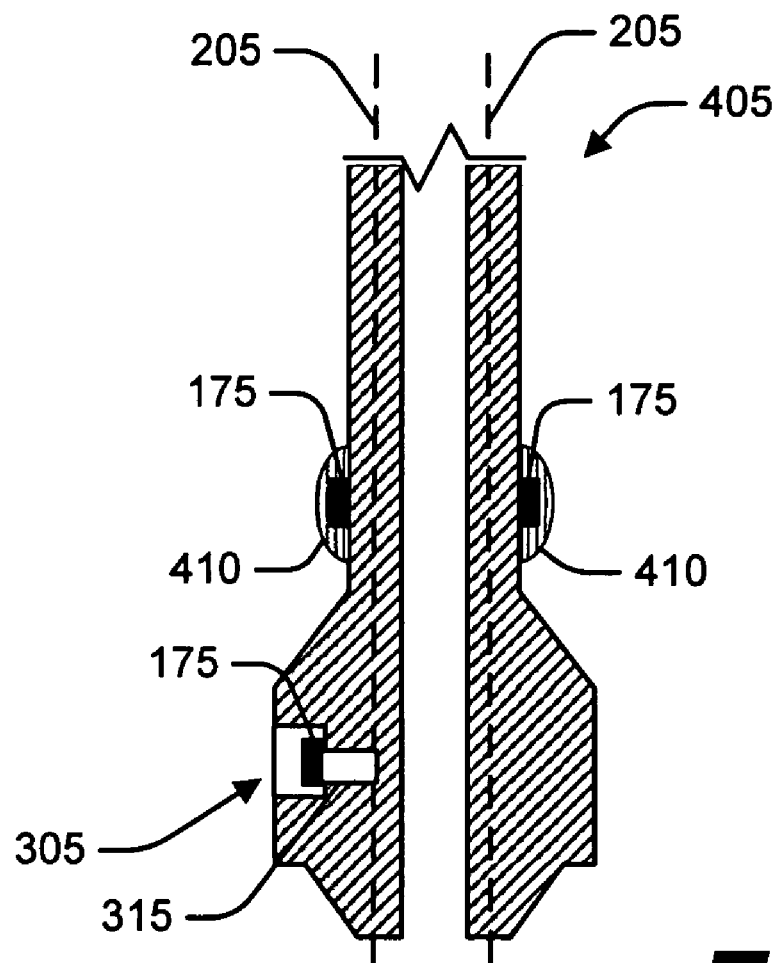
FIG. 4 is a cut-away diagram of the pin-end of a drillpipe joint with sensors affixed to the joint.

Sensor modules 175 may also be located in the pin ends of drillstring elements, for example drillpipe joints. A cross-sectional diagram of the pin end 405 of a drillpipe joint is shown in FIG. 4. The pin end 405 of the joint may include a sensor module receptacle 305. One or more sensor devices may be configured within sensor-module receptacle 305, for example, with any of the sensor device quantities, symmetry, types, directions, orientations, coupling approaches, wiring, and other characteristics of the sensor devices discussed above. One or more sensor modules 175 may be affixed to the exterior of the drillpipe joint. One or more sensor module 175 may include one or more sensor devices affixed to the exterior of the drillpipe joint, an electronics module located elsewhere (e.g. in a sensor module receptacle 310), and wiring between the two. One or more sensor modules 175 or portions of sensor module 175 (e.g. sensor devices) may be encased in a covering 410. In certain implementations, the covering 410 may include, for example, a hermetic elastomer or epoxy. One or more of the sensor modules 175 mounted to the exterior of the drillpipe may be located near the pin end upset. One or more sensor modules 175 mounted to the exterior of the drillpipe may be located on a smaller cross-sectional area section as shown in FIG. 4. Such mounting may provide greater strain for a given force or torque as compared to mounting on an upset section and may enhance force or torque measurement quality (e.g. resolution). In general, one or more sensor modules 175 may be configured to measure one or more of tension, compression, torque, or bending. The pin end 405 insert may include one or more communications couplers, such as drillpipe coupler 315. The communications medium 205 may be disposed in the drillpipe.

Figure 5:
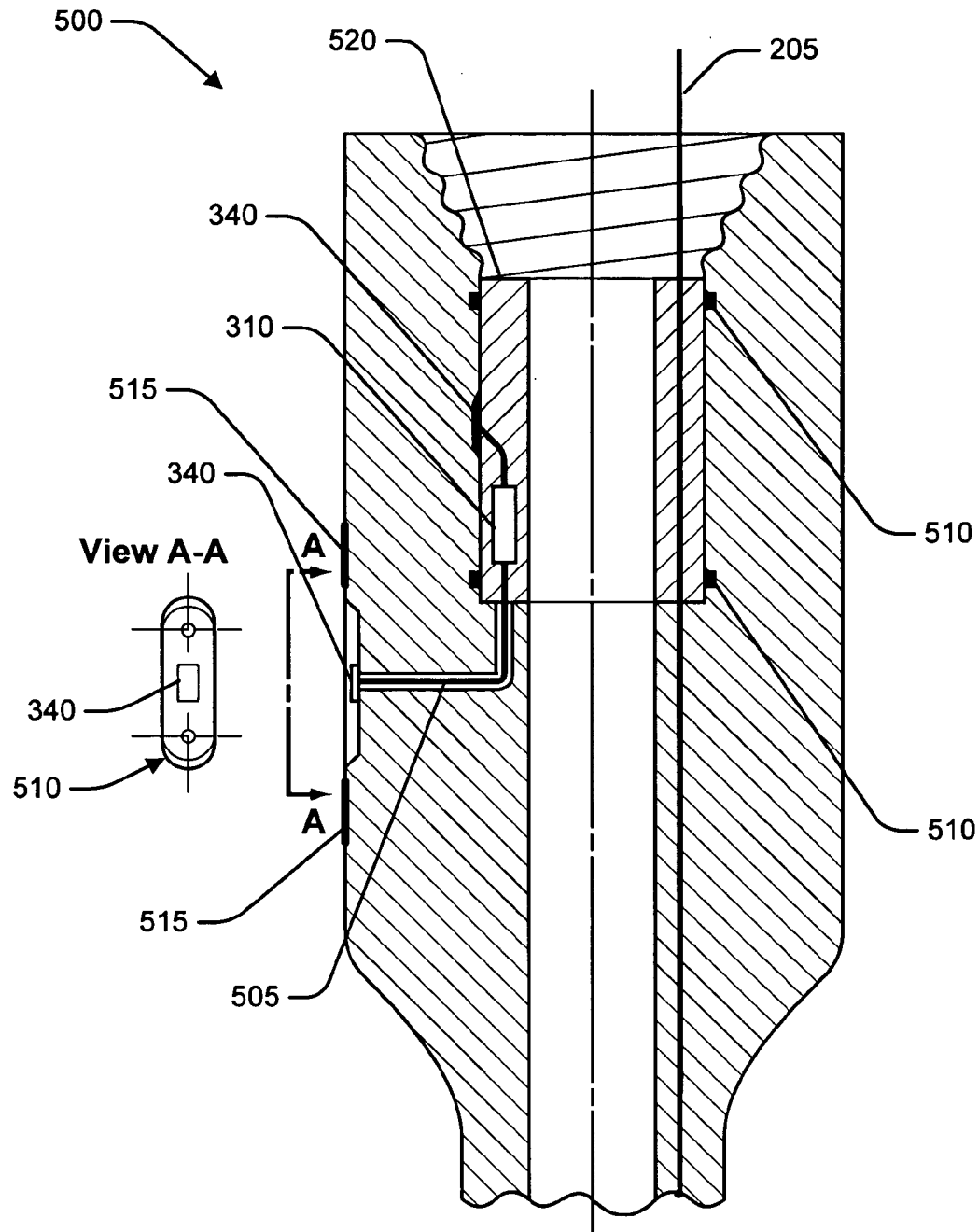
FIG. 5 is a cut-away diagram of a sub with a sensor module.

A cross-sectional diagram of an example sub 155 is shown in FIG. 5. The sub 155 shown in FIG. 5 may include threading to attach between two drillpipe joints. An elongated box joint 500 of the sub 155 is shown, as an example, with similar implementations possible for other drillstring components. A sensor module 175 is shown comprised of an electronics module 310, one or more sensor devices 340, and wiring 505 between the sensor devices 340 and the electronics module 310. One or more portions of the exterior of sub 155 may be cut or milled away to form relatively shallow "flats," such as flat 510, at one or more locations. One or more flats 510 may be oriented around the circumference of sub 155. One or more sensor devices 340 may be adhered to the flats 510. The adhered sensor devices 340 may be protected from the ambient mud with an overlay. The overlay may be, for example, an epoxy, or an elastomer. Hard facing 515 such as a satellite overlay may also be employed near the flats for protection from the borehole wall.

The sensor module 175 may include "dummy" sensor devices proximately located and coupled in a manner to not respond to strain in the drillstring element. Alternatively, or in addition, one or more sensor devices 340 may be coupled to the inner bore of sub 155. The box-end of the sub 155 may be bored back to retain a box-end insert 520. The box-end insert 520 may include one or more electronics modules 310. Wiring 505 may be routed from one or more of the sensor devices 340 coupled to the exterior of sub 155 through drilled holes and through hermetic sealing connectors, for connecting or soldering to the electronics module 310. Wiring 505 may be routed from one or more sensor devices 340 coupled to the inner bore of sub 155 to the electronics module. The electronics module 310 may include a sensor-module coupler to couple the sensor module 175 to the communications medium 205. In one implementation, the sub 155 and box-end insert 520 may include one or more sensor devices 340 configured to measure forces, such as one or more of axial tension, axial compression, torque, or bending. The sub 155 and the box-end insert 520 may further include one or more sensor devices 340 configured to measure acceleration, vibration, rotation, or other properties. The communications medium 205 may be disposed in the sub 155 and the sensor module 175 (e.g., the electronics module 310) may include a sensor-module coupler to couple the sensor devices 340 to the communications medium 205. As discussed above, the sub 155 may include communication equipment.

Figure 6:
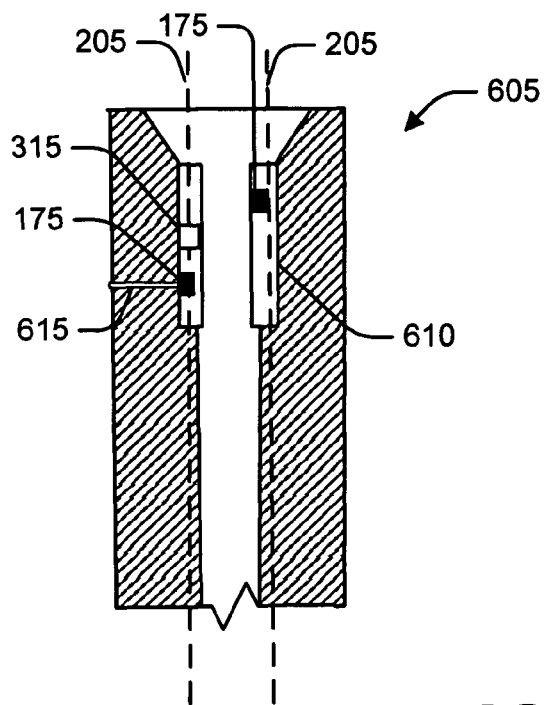
FIG. 6 is a cut-away diagram of a drillpipe joint with a sensor module in the box portion.

A cross-sectional diagram of the box end 605 of a drillpipe joint is shown in FIG. 6. The joint of drillpipe includes a box end 605 adapted to retain a box-end insert 610. The box end 605 may include an elongated upset portion. The interior of the box end 605 of the joint may be bored back (beyond the threads) to allow the box-end insert 610 to be placed in the bored-back area. The box-end insert 610 may include one or more sensor modules 175. The sensor modules 175 may be coupled to measure one or more properties.

In the case of sensor modules 175 to measure one or more pressures, the physical properties may include, for example, bore pressure or annular pressure exterior to the drillpipe joint. One or more sensor modules 175 mounted in the box-end insert 610 may be coupled with a conduit 615 to the exterior of the drillpipe joint. The conduit 615 may include one or more drilled holes, one or more capillary tubes, one or more seals, or other means to port the annular pressure to a pressure sensor disposed within the drillpipe joint. In general, one or more sensor modules 175 may be ported to measure bore or internal pressure.

In the case of sensor modules 175 to measure one or more accelerations, vibrations, or rotational velocities the physical properties may include acceleration, vibration, or rotational velocity on the interior or the exterior of the drillpipe joint. In general one or more sensor modules 175 may be affixed to measure accelerations, vibrations, or rotation. Other sensor modules 175 may be included in the box-end insert 610 to measure other properties. One or more sensor modules 175 in the box-end insert 610 may include two or more sensor devices 340 to measure two or more properties.

The box-end insert 610 may include one or more communication couplers, such as drillpipe coupler 315. The box-end insert 610 may include other communication or processing equipment.

Figure 7:
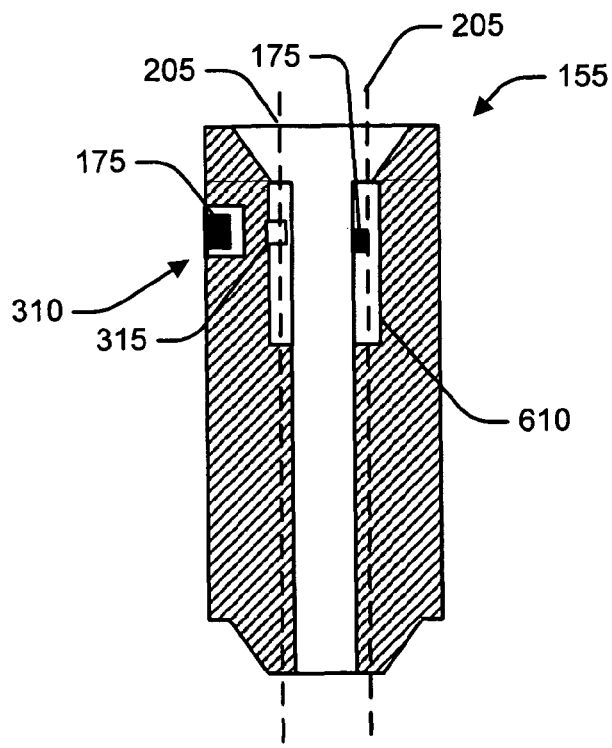
FIG. 7 is a cut-away diagram of a sub with a sensor module in the box portion.

A cross-sectional diagram of an example sub 155 is shown in FIG. 7. The sub 155 shown in FIG. 7 may include threading to attach between two drillpipe joints. One or more portions of the sub 155 may be cut away to form sensor-module receptacles 310 to contain a sensor modules 175. The sub 155 may include a drillpipe coupler 315 to couple the sensor module 175 to the communications medium 205. The box-end of the sub 155 may be bored back to retain a box-end insert 610. In the case of sensor modules 175 to measure one or more pressure, the box-end insert 610 may include one or more sensor modules 175 ported to measure annular pressure. The box-end insert 610 may include one or more sensor modules 175 ported to measure bore pressure. The box-end insert 610 may include one or more sensor modules 175 affixed to measure one or more of acceleration, vibration, or rotation. The box-end insert may include one or more communications couplers, such as drillpipe coupler 315. The communications medium may be disposed in the sub 155. As discussed above, the sub 155 may include communication equipment.

Figure 8:
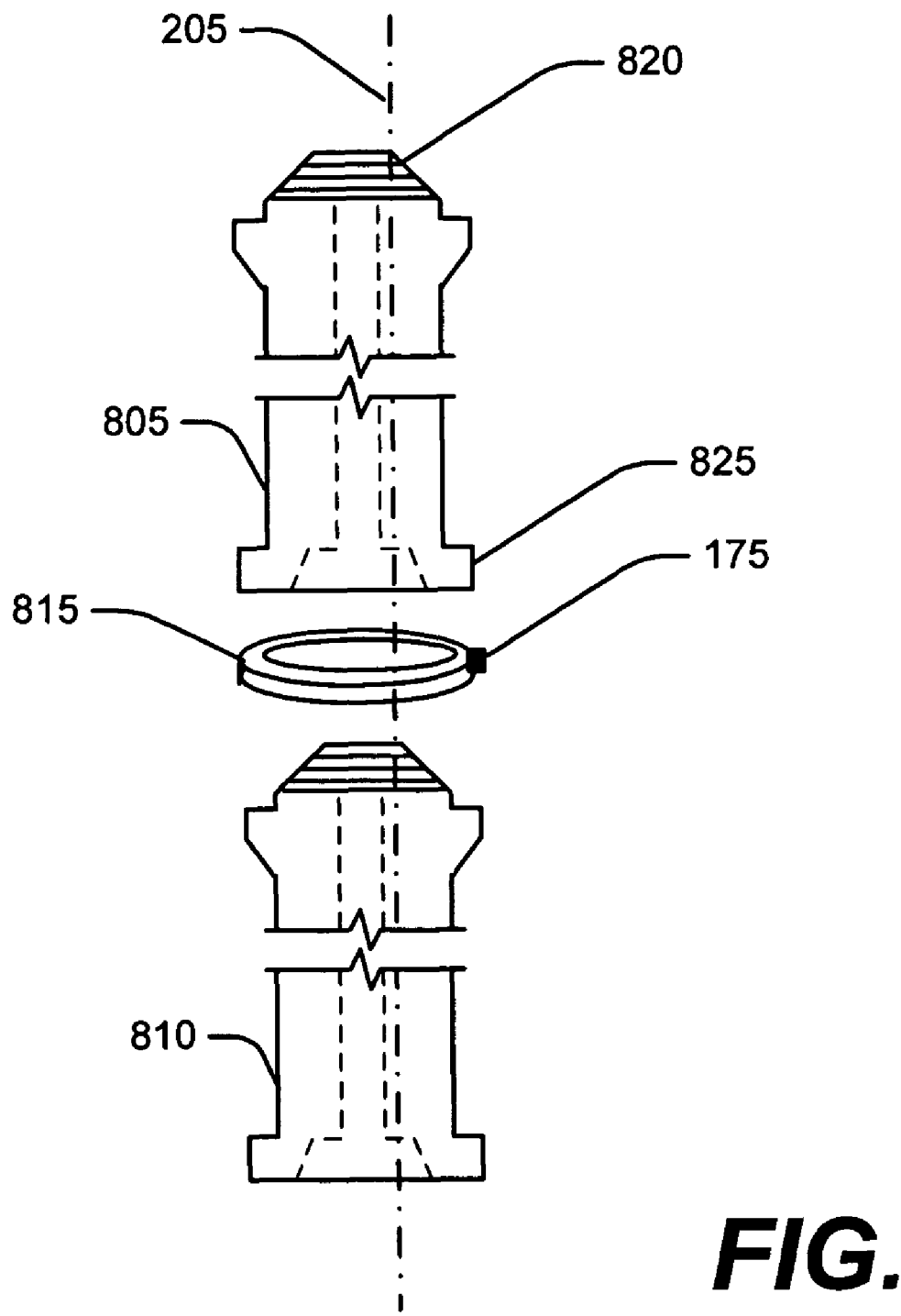
FIG. 8 illustrates drillpipe joints and a gasket.

In addition to sensor-module receptacles 310, sensor modules 175 may also be mounted on gaskets between joints of drillpipe. Two joints of drillpipe 805 and 810 with a gasket 815 are schematically illustrated in FIG. 8. Each of the joints of drillpipe 805 and 810 have a pin end 820 and a box end 825. Both the pin and box ends may include threading and load shoulders to allow forming the drillpipe 140 from the joints. A gasket 815 may be placed between the load shoulder of box end 820 of drillpipe joint 805 and the load shoulder of pin end 815 of drillpipe joint 810. When the two joints 805 and 810 are joined together, the gasket is located at the interface between the joints. A sensor module 175 may be incorporated within gasket 815 or may be mounted to the exterior of gasket 815. The output of the sensor in the sensor module 175 may be coupled to the communications medium 205 using one or more of the methods described below with respect to FIGS. 11-12. This arrangement allows the mounting of sensor modules 175 on the drillstring without sensor receptacles in the drillpipe 140. The gasket-mounted sensor modules 175 may be used alone, or in conjunction with sensor modules 175 mounted as described above. In another embodiment, a sensor-module receptacle 310 may be created in the exterior of the gasket 815.

Figure 9:
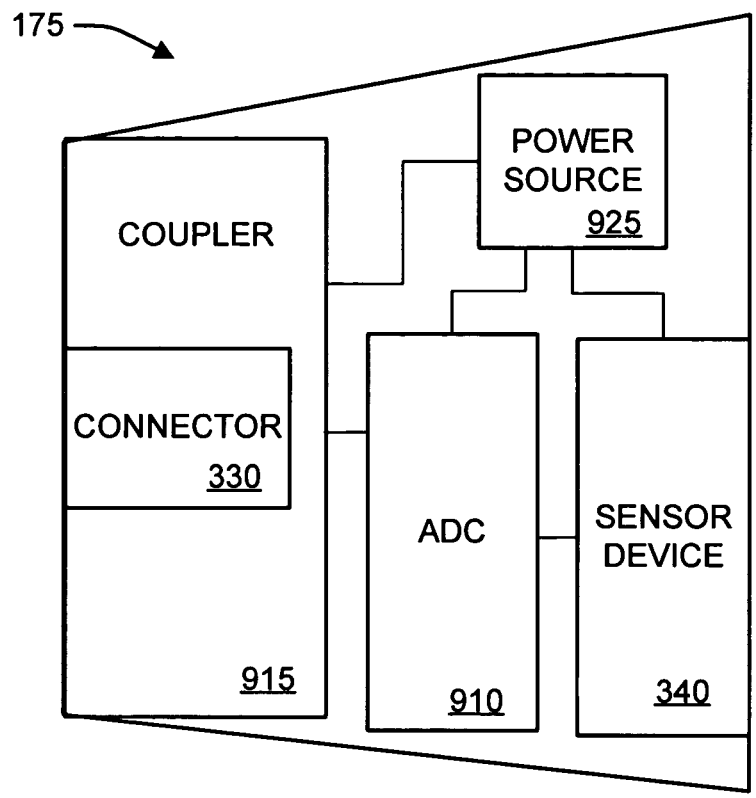
FIG. 9 shows a block diagram for a sensor module.
Figure 10:
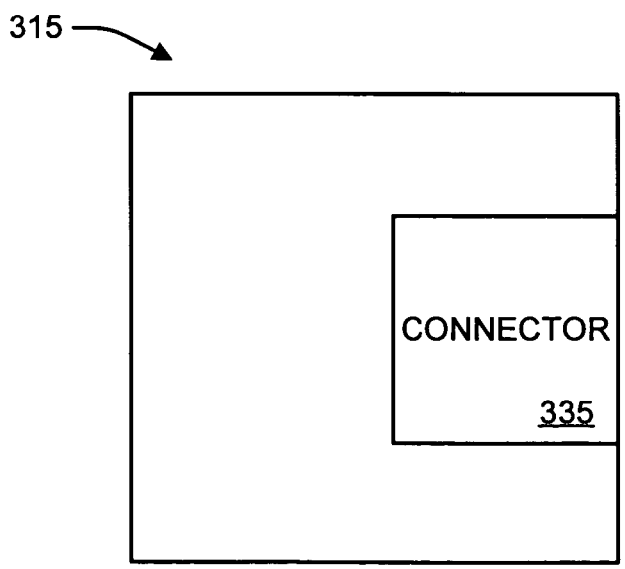
FIG. 10 shows a block diagram of a drillpipe coupler.

An example sensor module 175, shown schematically in FIG. 9, includes a sensor device 340 to produce a signal indicative of a physical property. The output from the sensor device 340 may be digital or analog. Depending on the mode of communications used over the communications medium 205, the output from the sensor device 340 may require conversion from analog to digital with an analog-to-digital converter 910. In certain implementations, the sensor module 175 may include a plurality of analog-to-digital converters 910 to accommodate multiple sensor devices 340. In other implementations, the sensor module 175 may include a multiplexer (not shown) to accommodate multiple sensor devices 340 with fewer analog-to-digital converters 910. After the sensor device 340 has produced a signal indicative of the measured property, the signal may be coupled to the communication medium 205 using a communications coupler, which may include a electronics module coupler 915 within the sensor module 175 and may include a drillpipe coupler. The electronics module coupler 915 may include a connector 330 for inducing a signal in the drillpipe coupler 315, shown in FIG. 10. The drillpipe coupler may include a connector 335 for engaging the sensor-module coupler connector 330. Connectors may include direct electrical connection and example suitable connectors of this type include those from Kemlon and Greene Tweed, both of Houston, Tex.

The communication coupler, which is the combination of the sensor module coupler 915 and the drillpipe coupler 315, performs signal transformations necessary to couple the sensor signal to the communications medium 205. One example communication coupler may re-encode the signal from the sensor device 340 or the analog-to-digital converter, include header information, and transmit the signal over the communication medium 205.

Figure 11:
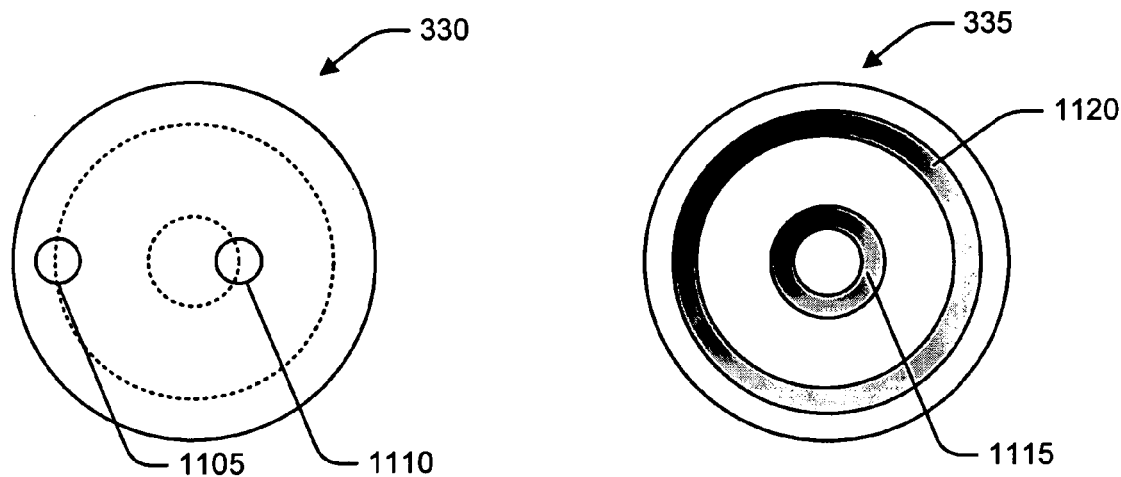
FIGS. 11 and 12 illustrate connectors for sensor couplers and drillpipe couplers.

An example complementary pair of electronics module coupler and drillpipe coupler connectors 330 and 335 is shown schematically in section view in FIG. 11. The drillpipe-coupler connector 330 includes two conductive plugs 1105 and 1110, which will protrude from the drillpipe 140 at the base of the sensor-module receptacle 305. The complementary sensor-coupler connector 335 includes two conductive rings 1115 and 1120. This arrangement allows the connectors 330 and 335 to mate when, for example, the electronics module sensor 310 is screwed into the sensor-module receptacle 305. In such a configuration, the drillpipe coupler 1005 and the electronics module coupler 915 have a direct electrical connection and the drillpipe coupler may be in direct electrical contact with the communications medium 205.

Figure 12:
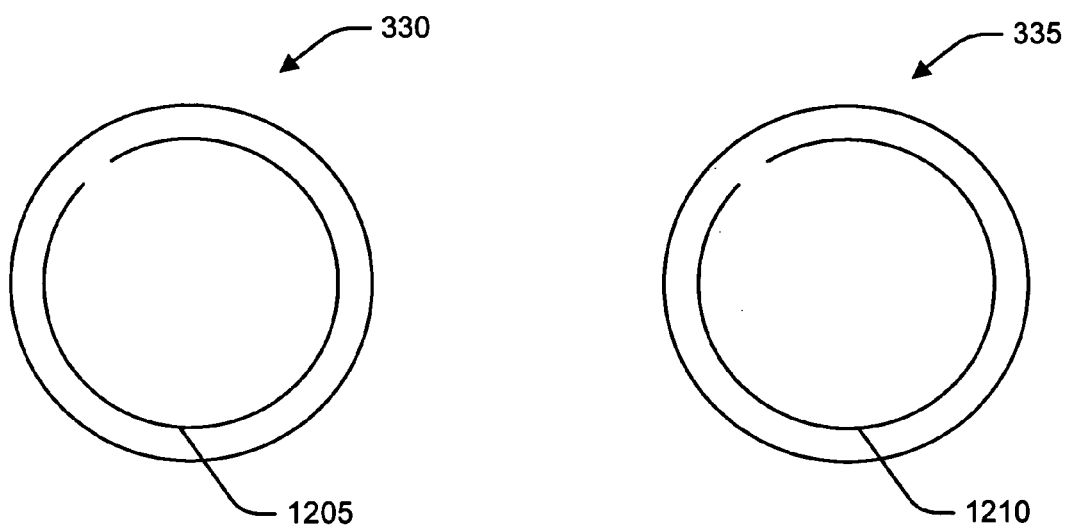

Another example complementary pair of sensor-coupler and drillpipe-coupler connectors 330 and 335 is shown in FIG. 12. The electronics module connector 330 includes an antenna 1205 and the drillpipe-coupler connector includes an antenna 1210. In such a configuration, the electronics module coupler 615 transmits the signal indicative of the one or more measured properties to the drillpipe coupler using wireless signaling. For example, the sensor and drillpipe coupler may communicate using short-hop telemetry or another wireless communication method. Each of the antennas 1205 and 1210 may be any antenna or other transducer capable of providing communication between the electronics module coupler 915 and the drillpipe coupler 1005.

In another example system, the electronics module coupler connector 330 and the drillpipe-coupler connector 335 may include inductors or coils. The electronics module coupler 915 may pass current though its inductor to create an electromagnetic field indicative of the force sensor signal. The electromagnetic field, in turn, induces a current in the drillpipe coupler's inductor. In another example system, the connectors 330 and 335 may form two plates of a capacitor allowing a signal to be capacitively induced on the opposing plate. The sensor module 175 or the base of the sensor-module receptacle 305 may include a coating or insert to provide a dielectric between the connectors 330 and 335 for capacitive coupling.

Figure 13:
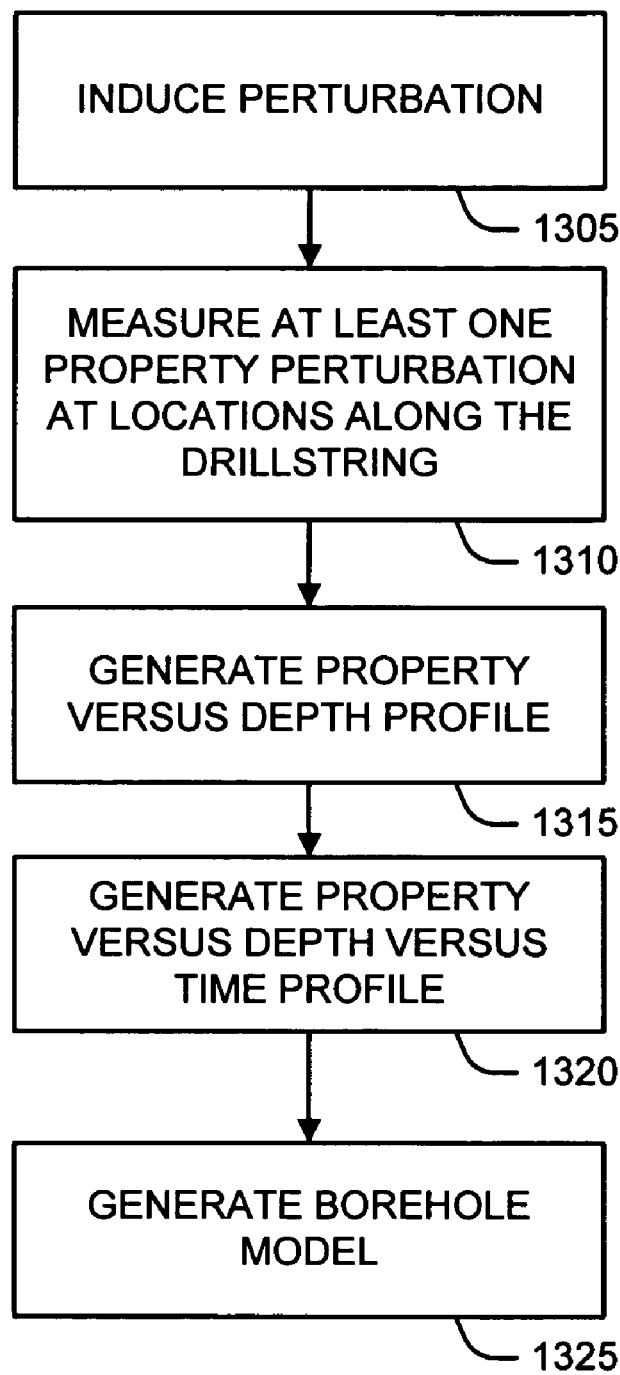
FIGS. 13-17 are block diagrams of a borehole analysis method.

An example borehole modeling method that may utilize the systems discussed above is shown in FIG. 13. Borehole models, in general, may be defined as a representation of the physical nature relating to one or more of the borehole and the drillstring in the borehole. A borehole model may comprise a collection of data on one or more properties relating to the borehole or drillstring, e.g. fluid pressures, drillstring forces, drillstring vibrations, temperatures, etc. A borehole model may comprise one or both of such data versus borehole location, and versus time. A borehole model may cover the entire borehole length, or a portion thereof. A borehole model may cover the entire drillstring length, or a portion thereof. It may include the portion of borehole and drillstring proximate to the MWD/LWD tools, which may be proximate to the hole bottom. A borehole model may include a portion of borehole 165 (or drillstring location) a significant distance from the bottom-hole, which may be at or proximate to drillpipe 140. A borehole model may include two or more sections of borehole or drillstring. Such sections may correspond, for example, to: (a) ranges of hole angle (e.g. vertical, curve, tangent section, horizontal section); (b) lengths of common drillstring element type (e.g. over collars, over heavyweight pipe, over drillpipe); (c) lengths of different casing diameters or hole diameters; (d) lengths of borehole exposure to one or more particular formation types; or (e) cased versus open hole sections.

A borehole model may include an analytical description of one or more properties of the borehole or drillstring. A borehole model may include an analytical description of one or more properties of the borehole or drillstring in combination with measured data, which may be used to calibrate, tune, or modify the analytical description. A borehole model may be represented graphically (e.g. via graphs, plots, logs). A borehole model may be represented visually via a schematic representation of one or both of a borehole or drillstring, with for example colors or other symbolic means of displaying one or more properties or property variations. A borehole model may be represented textually, e.g. with a table of numbers.

In general, the borehole modeling system and method may be used to observe one or more dynamic phenomenon which may occur during the drilling process. Observation of dynamic phenomena may useful for establishing drilling process baselines associated with one or more properties, which may represent predictions or expectations. Such observations may be useful for detecting changes with respect to such baselines. Such changes may be results of deliberate changes to the borehole or drillstring (e.g. adding new joint of pipe, changing rotary RPM, changing mud weight), or may be a result of a condition developing in regard to one or both of the borehole or the drillstring. The conditions in one or both of the borehole or the drillstring may be important to flag, monitor, and/or take action upon. Such conditions may include, for example, and without limitation: cuttings build-up, borehole obstruction, influx, and differential sticking.

Example dynamic phenomenon that may be represented in a borehole model may include transients in one or more physical property values that travel along (e.g., up, down, or both) the physical media (e.g., the drillstring, the borehole 165, or the drilling fluid). The transients observed by the system may include pressure perturbation in the bore or annulus. In some implementations, the pressure perturbations may be deliberately created (e.g., by venting or pulsing the drilling fluid). In other implementations, the pressure perturbations may be created by drilling operations, for example, by a mud motor, triplex mud pumps at surface, the drilling bit 160 on the bottom of the borehole 165, or other elements of the drilling apparatus 100. The transients observed by the system may include stress or strain waves traveling up or down the drillstring. The stress or strain waves may be torsional, axial, or both. The transients observed by the system may include thermal transients that travel up and down the flow path. For example, the thermal transients may travel with the drilling fluid flow.

The example method includes inducing one or more perturbations in the borehole 165 (block 1305). One or more changes in physical properties due to the perturbation are measured at two or more locations downhole (block 1310). At least one of the two or more locations downhole may be proximate to the drillpipe. The processor 180 may generate a property versus depth profile (block 1315). In certain implementations measurements are made at three or more locations downhole, and at least two or more property versus depth profiles are generated. The processor 180 may generate a property versus depth versus time profile (block 1320). The processor 180 may model the borehole 165 based, at least in part, on the property versus depth versus time profile (block 1325).

In one example implementation of generating perturbations (block 1305), one or more short pressure transients (e.g., 1 second) may be deliberately created at surface or downhole to propagate the length of the annular returns flow path. The positive or negative perturbation, or "pulse", would travel the annulus length at the sound speed of the medium (i.e. 4000-5000 ft/sec), similar in manner to that of mud pulse telemetry, which may be used up the center of the drill pipe 165.

In an example implementation of generating a property versus depth profile (block 1315), one or more sensor modules 175 may send property measurements to the processor 180. In certain implementations, the sensor modules 175 may time stamp their measurements, while in other implementations, the processor 180 may time stamp the measurements. The processor 180 may compare the pulse signature from different sensor modules 175 along the drill string to qualitatively assess one or more mud properties. The processor 180 may performing post-processing on the received measurements to deconvolve the multiple reflections (e.g, from flow area changes).

In some implementations, the property measurements from the sensor modules 175 may be measured substantially simultaneously. As used herein, "substantially simultaneously" means only that the measurements are taken in the same time period during which conditions are not expected to change significantly, in the context of the particular operational process. Many downhole conditions (e.g., cuttings build-up) may be detected using property versus depth profiles, the values of which are obtained in a time window of minutes. During transient operational processes such as tripping, and for detection of events or conditions which have a faster time constant, a shorter time window for collecting and analyzing a property versus depth profile may be preferred. For example, when measuring property changes due to induced perturbations which may travel though the drilling fluid at 4,000 to 5,000 feet per second, the time interval between property measurements in a property versus depth profile may be very short to achieve a useful resolution. Individual measured properties along the drillstring in the property versus depth profile may be measured in a short time window (e.g. within a second or less), and such short-time-window measurement process may then be repeated one or more additional times during a larger time window of seconds to minutes. An averaged property versus depth profile may be created from averaging the multiple values for each property sensor. Other statistics may be developed for each measured property in the property versus depth profile. The statistics may include, for example, minimum and maximum values and standard deviation. Averaged values, optionally in conjunction with further statistics, may be preferred for use during certain operational processes in which conditions are anticipated to have a dynamic element (e.g. stick-slip during drilling). In other implementations, the property measurements from the sensor modules 175 may be measures according to a configurable sequence that may be controlled by the processor 180.

Figure 14:
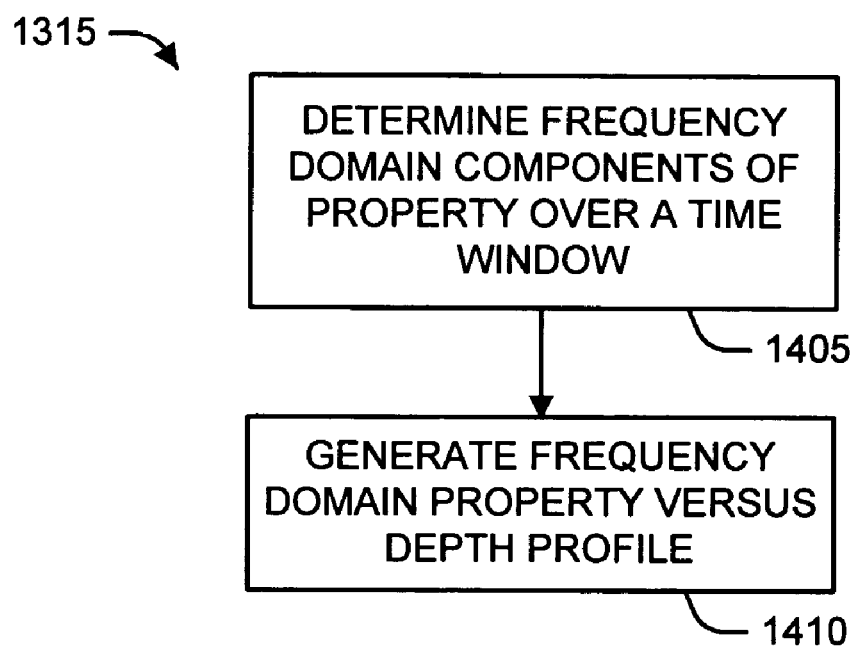

In some implementations, the property versus depth profile (block 1315) may include one or more frequency domain values for one or more properties at one or more depths. As shown in FIG. 14, the processor 180 may determine one or more frequency domain components of a measured property over a time window (block 1405). These frequency domain values may be obtained, for example, by time to frequency domain transforms such as rolling FFT. To obtain the time domain value for these frequency domain properties, the processor 180 may receive or compile sufficient measurement over a time window. The processor 180 may generate a frequency domain property versus depth profile (block 1410).

The processor 180 may also generate one or more property versus depth versus time profiles (block 1320). In general, the property versus depth versus time profiles may be generated by compiling two or more property versus depth profiles obtained at different times. In other implementations, the processor 180 may interpolate over time to determine one or more entries in the property versus depth versus time profiles. The processor 180 may generate one or more property versus depth versus time profiles where the property values are frequency domain, as described above with respect to block 1315.

In certain implementations, the system may not induce perturbations in the borehole 165 (block 1305), instead the system may engage in passive listening for natural perturbations. In one example implementation the processor 180 may analyze one or more perturbations that are functions of the drilling process. For example, the normal drilling related pressure "noise" may be picked up by pressure sensors in sensor modules 175. Based on the pressure signals, the processor 180 may perform analysis at surface, such as a rolling FFT, to determine frequency content and associated power corresponding to periodic bit induced noise (i.e. noise created with every rotation), mud motor noise, noise from the triplex mud pumps, and noise from other sources. The relative attenuation of particular FFT components over time, and between pressure sensors in sensor modules 175 along the drillstring, may be indicative of changes in the telemetry channel as in the case of deliberate perturbations. This analysis may be qualitative, but certain conditions (e.g., gas influx) and other important flags may be detected in this manner.

Figure 15:
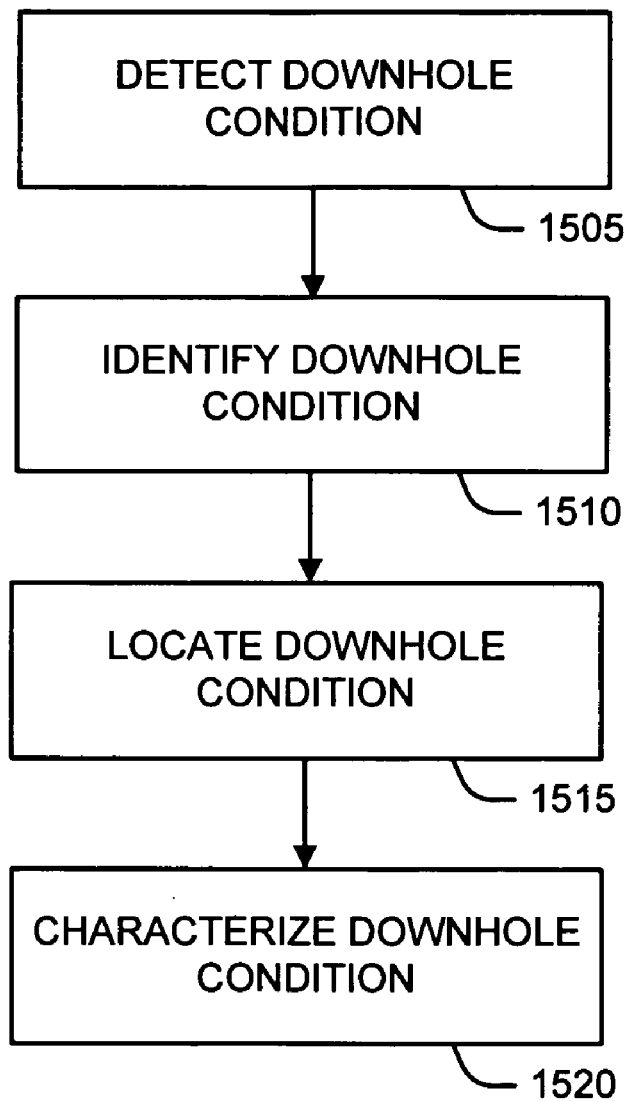

An example system of creating the borehole model (block 1325) is shown in FIG. 15. In general, creating the borehole model may include detecting, identifying, locating, or characterizing one or more properties of the borehole for one or more time intervals. The processor 180 may detect a downhole condition (block 1505). In general, a downhole condition may include any regular or irregular, static or dynamic, condition or event along one or both the borehole or drillstring. Example downhole conditions may include, but are not limited to, one or more of the following: a flow restriction, a cuttings build-up, a wash-out, or an influx. The processor may further identify the downhole condition (block 1510). Identifying the downhole condition may include determine a likely cause of the down hole condition (e.g., influx, cutting-build up). The processor 180 may locate the downhole condition (block 1515). In some example implementations, the processor 180 may identify a range of likely depths for the downhole conditions. The processor may characterize the downhole condition (block 1520). The characterization may include determining a severity or some property of the downhole condition. In some example implementations, one or more of blocks 1505-1520 may be omitted. For example, the processor may be able to locate a downhole condition that may not be able to identify.

Figure 16:
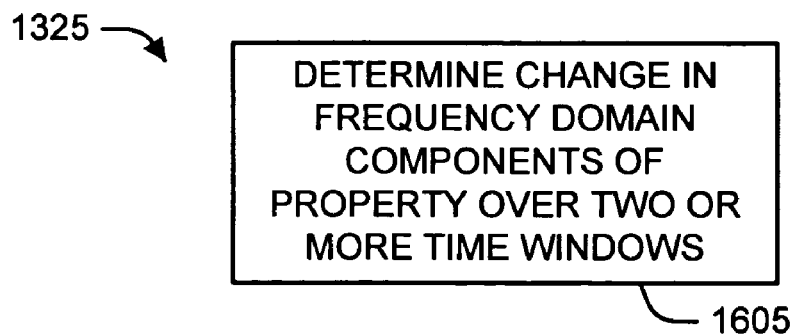

Another example method of modeling the borehole 165 (block 1325) is shown in FIG. 16. The processor 180 may determine one or more changes in frequency domain components of a property over two or more time windows (block 1605). In some example implementations of modeling the borehole 165, the processor 180 may observe dynamic phenomenon which occur in the drilling process that may be represented as standing waves in the physical media (e.g., the drillpipe 140 or the drilling fluid). These phenomenon may result from a substantially periodic forcing function (e.g., mud pumps, drill bit 160 on the bottom of the borehole 140, or rotation of the drillpipe 140) and may be dynamically represented in the media as standing waves. The phenomenon may be represented as property measurements at a depth with a relatively constant power spectral distribution (PSD). The relative constancy may represent nothing out of the ordinary happening. A change in the frequency content from a first time window to a second time window may represent one or more of a change in the forcing function or a change in the medium. If it represents a change in the medium, it may be a change that is expected (e.g., the addition of a joint of drillpipe 140), or it may represent an unexpected change, such as the change of a boundary condition such as contact points between the drillstring and the borehole.

In one example implementation, the processor 180 may analyze a series of pressure perturbations in the annulus along the drillstring. The processor 180 may track the transient (e.g., the pressure pulse). The processor my observe the overall attenuation of the transient and may also observe any change in the frequency content of the transient as it travels along the annulus. The processor 180 may infer properties of the drilling fluid such as density change, cuttings load, transition of the primary phase (e.g. oil vs. water, liquid vs. gas), or the presence of gas (e.g. a kick).

Figure 17:
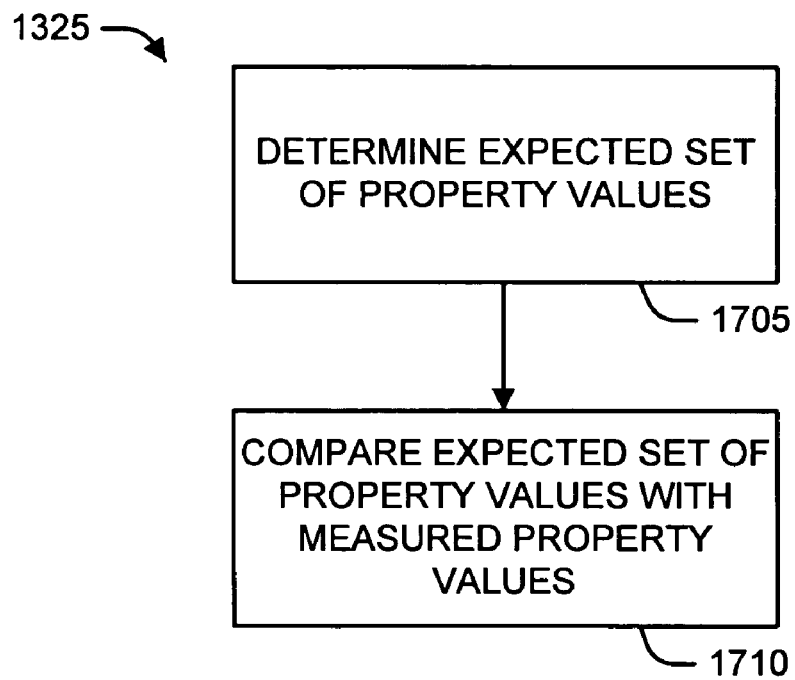

FIG. 17 shows another example method of modeling the borehole 165 (block 1325). The processor 180 may determine an expected set of property values (block 1705) and compare the expected set of property values with measured property values (block 1710). For example, the processor 180 may compare the transients characteristics with a set of one or more expected values. The expected set of values may be obtained from one or more of modeling or previously obtained data. Assuming the processor 180 collects property values from multiple locations along the drillstring, the location or a range of possible locations of the change in the media may be determined. The location of the change in media may be determined by observing the deviation of a physical property versus depth, using measurement data associated with a single time window. The resolution of the locating may depend upon the number of measurement locations. This deviation may be in respect to the set of expected values. Alternatively or in combination, the location of the change in media may be determined by establishing a baseline of measurements associated with the perturbation in one or more time windows, and then comparing the measurements taken at a subsequent time window associated with another similar perturbation. The deviations versus time at each measure location may be indicative of the likely location of the downhole condition.

In other example implementations, the processor 180 may analyze a series of stress or strain or acceleration perturbations along the drillstring. An impact source (e.g. bit bouncing on bottom), or a torsion source (e.g. bit slip-stick), neither of which may be desirable while drilling nonetheless may occur, and may be employed in an analysis. Alternatively or in combination, a deliberate stress or strain or acceleration perturbation of the drillstring may be utilized at surface, near bottom, or along the drillstring. The processor 180 may track the transient (e.g., the bit-bounce impact wave). The processor my observe the overall attenuation of the transient and may also observe any change in the frequency content of the transient as it travels along the drillstring. The processor 180 may infer properties of the drillstring such as contact with the formation. The processor 180 may compare the transients characteristics with a set of one or more expected values. The expected values may be obtained from one or more of modeling or previously obtained data. Assuming the processor 180 collects property values from multiple locations along the drillstring, the location or a range of possible locations of the change in the media may be determined. The location of the change in media may be determined by observing the deviation of the measurement versus depth, using measurement data associated with a single time window. The resolution of the locating may depend upon the number of measurement locations. This deviation may be in respect to the set of expected values. Alternatively or in combination, the location of the change in media may be determined by establishing a baseline of measurements taken associated with the perturbation in one or more time windows, and then comparing the measurements taken at a subsequent time window associated with another similar perturbation. The deviations versus time at each location may be indicative of the likely location of a downhole condition, for example a cuttings build-up, a borehole deviation (e.g. large dogleg or keyseating), or a differential sticking.

In one or more of identifying a particular downhole condition (block 1510), characterizing the downhole condition (block 1520), and locating the downhole condition (block 1515), the processor may consider the manner in which certain downhole conditions affect the properties being measured. Many such relationships are known or knowable. With regard to pressure perturbations, acoustic transmission characteristics of fluids are known to vary with the viscosity, density, bulk modulus, multi-phase characteristics, and other properties of such fluids. Such relationships may be determined empirically. With regard to stress or strain perturbations in the drillstring, acoustic transmission characteristics of steel and other drillstring materials and reflections associated with, for example, cross sectional area changes are known or modelable, or empirically determinable. Effects of varying boundary conditions (e.g. clean hole vs. cuttings build-up, differential sticking, dog-legs and key seats) on the acoustic transmission in drillstring components too may be modeled or determined empirically.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A borehole analysis method, comprising:
   measuring at two or more depths along a drillstring at least one property that is subject to perturbation, where at least one of the depths corresponds to the location of a drillpipe; and
   recording a time when each property is measure at each depth; and
   generating a property versus depth versus time profile based on the property measurements.

2. The borehole analysis method of claim 1, where measuring at two or more depths along the drillstring at least one property that is subject to perturbation, comprises:
   measuring at three or more depths along the drillstring at least one property that is subject to perturbation.

3. The borehole analysis method of claim 1, where measuring at two or more depths along the drillstring at least one property that is subject to perturbation, comprises:
   measuring at two or more depths the at least one property along the drillstring substantially simultaneously.

4. The borehole analysis method of claim 1, further comprising:
   generating a model of the borehole based, at least in part, on the property versus depth versus time profile.

5. The borehole analysis method of claim 1, further comprising:
   detecting a downhole condition based, at least in part, on the property versus depth versus time profile.

6. The borehole analysis method of claim 1, further comprising:
   identifying a downhole condition based, at least in part, on the property versus depth versus time profile.

7. The borehole analysis method of claim 1, further comprising:
   locating a downhole condition based, at least in part, on the property versus depth versus time profile.

8. The borehole analysis method of claim 1, further comprising:
   characterizing a downhole condition based, at least in part, on the property versus depth versus time profile.

9. The borehole analysis method of claim 1, where the perturbation is a function of the drilling process.

10. The borehole analysis method of claim 1, further comprising: generating the perturbation.

11. A computer program, disposed in a tangible medium, for analyzing a borehole, comprising executable instructions that cause a computer to:
   receive measurements corresponding to two or more depths along a drillstring of at least one property subject to perturbation, where at least one of the depths corresponds to the location of a drillpipe; and
   receive a time when each property is measured at each depth; and
   generate a property versus depth versus time profile based on the property measurements.

12. The computer program of claim 11, where the executable instruction that cause the computer to receive measurements corresponding to two or more depths along a drillstring of at least one property subject to perturbation at, further cause the computer to:
   receive measurements corresponding to three or more depths along a drillstring of at least one property subject to perturbation.

13. The computer program of claim 11, where the measurements were taken substantially simultaneously.

14. The computer program of claim 11, where the executable instructions further cause the computer to:
   generate a model of the borehole based, at least in part, on the property versus depth versus time profile.

15. The computer program of claim 11, where the executable instructions further cause the computer to:
   detect a downhole condition based, at least in part, on the property versus depth versus time profile.

16. The computer program of claim 11, where the executable instructions further cause the computer to:
   identify a downhole condition based, at least in part, on the property versus depth versus time profile.

17. The computer program of claim 11, where the executable instructions further cause the computer to:
   locate a downhole condition based, at least in part, on the property versus depth versus time profile.

18. The computer program of claim 11, where the executable instructions further cause the computer to:
   characterize a downhole condition based, at least in part, on the property versus depth versus time profile.

\* \* \* \* \*